United States Patent [19]

Hübner et al.

[11] 4,179,370

[45] Dec. 18, 1979

[54] FLOCCULATING AGENT COMPRISING WATER-IN-OIL EMULSION OF STABILIZER PLUS NH-ACTIVE POLYMER CARRYING FORMALDEHYDE AND AMINE RADICALS

[75] Inventors: Wolfgang Hübner, Kempen; Eduard Barthell, Krefeld; Kurt Dahmen, Mönchen-Gladbach, all of Fed. Rep. of Germany

[73] Assignee: Chemische Fabrik Stockhause & Cie, Krefeld, Fed. Rep. of Germany

[21] Appl. No.: 923,423

[22] Filed: Jul. 10, 1978

Related U.S. Application Data

[60] Division of Ser. No. 682,543, May 3, 1976, Pat. No. 4,113,685, which is a continuation-in-part of Ser. No. 538,428, Jan. 2, 1975, Pat. No. 4,093,542, which is a continuation-in-part of Ser. No. 485,474, Jul. 3, 1974, abandoned.

[30] Foreign Application Priority Data

May 6, 1975 [DE] Fed. Rep. of Germany ....... 2520028

[51] Int. Cl.$^2$ .......................... B01D 21/01; C02B 1/20
[52] U.S. Cl. ........................................... 210/51; 210/54
[58] Field of Search ............................. 210/47, 51, 54

[56] References Cited

U.S. PATENT DOCUMENTS

| | | | |
|---|---|---|---|
| 3,131,165 | 4/1964 | Hermann et al. | 260/45.9 P |
| 3,775,312 | 11/1973 | Merchant, Jr. | 210/51 |
| 3,778,367 | 12/1973 | Pruessner | 210/51 |
| 3,790,529 | 2/1974 | Fujimura et al. | 528/486 |
| 3,875,097 | 4/1975 | Sediak | 260/29.4 UA |

Primary Examiner—J. Ziegler
Attorney, Agent, or Firm—Sprung, Felfe, Horn, Lynch & Kramer

[57] ABSTRACT

A flocculation, sedimentation, dehydration or retention composition comprising a stable dispersion of about 10 to 50% concentration by weight of a polymeric Mannich base in a mixture of water, a water-insoluble liquid and an emulsifier all present as a water-in-oil emulsion, the Mannich base comprising an NH-active polymer carrying carbonamide groups at least about 10% of which carry radicals of a reaction therewith of formaldehyde and a primary or secondary alkyl- or hydroxyalkyl-amine wherein the alkyl groups have up to about 18 carbon atoms, and a stabilizing amount of a water-soluble salt of a mono- or multivalent amine, alone or in admixture with a mono- or multivalent amine or ammonia, or of an ammonium salt of a mineral acid and ammonia, or of a carboxylic acid amide. The amine of the Mannich base is preferably dimethylamine or diethylamine and is used in approximately the same molar amount as the formaldehyde. The polymer preferably comprises acrylamide units and the polymerization may be effected either before or after reaction with the formaldehyde and amine.

11 Claims, No Drawings

FLOCCULATING AGENT COMPRISING WATER-IN-OIL EMULSION OF STABILIZER PLUS NH-ACTIVE POLYMER CARRYING FORMALDEHYDE AND AMINE RADICALS

This application is a division of Application Ser. No. 682,543, filed May 3, 1976, now U.S. Pat. No. 4,113,685, which is a continuation-in-part of Application Ser. No. 538,428, filed Jan. 2, 1975, now U.S. Pat. No. 4,093,542, which was a continuation-in-part of Application Ser. No. 485,474, filed July 3, 1974, now abandoned.

The invention relates to liquid, stable polymer dispersions having a cationic action and to their use as flocculation, sedimentation, retention and dehydration auxiliaries.

Application Ser. No. 538,428, filed Jan. 2, 1975, the disclosure of which is incorporated herein by reference, describes plastic dispersions based on aminomethylated polymers, preferably polyacrylamide, which are suitable for use as flocculation, sedimentation, retention and dehydration auxiliaries. These products represent a technical advance in comparison to to the previous state of the art, since, unlike the previously known products, they are liquid products having a comparatively high content (about 30%) of active substance. Products of the prior state of the art were based on aminomethylated polyacrylamide, so-called Mannich bases, in the form of aqueous solutions having a content of only about 5 to 10% by weight of active substance, and having a high viscosity even at this concentration, so they were therefore difficult to work with or to transport.

In the course of further experiments, it was found that the activity of the concentrated liquid products according to Application Ser. No. 538,428 in accelerating the sedimentation of aqueous slurries of mineral substances, diminished with the passage of time so the product had to be used shortly after having been made.

It is therefore an object of the present invention to improve the durability of the activity of these products.

This object has been realized in accordance with the present invention pursuant to which a dispersion of about 10 to 50% concentration of a polymeric Mannich base in a mixture of water, a water-insoluble liquid and an emulsifier and present as a water-in-oil emulsion, and of the character hereinafter described, has its activity stabilized by the addition thereto of water-soluble salts of mono- or multivalent amines alone or in admixture with mono- or multivalent amines, or ammonia or ammonium salts of mineral acids and ammonia, or carboxylic acid amides of carboxylic acid.

The Mannich base comprises an NH-active polymer carrying carbonamide group at least about 10% of which carry radicals of a reaction therewith of fromaldehyde and a primary or secondary alkyl- or hydroxyalkylamine wherein the alkyl groups have up to about 18 carbon atoms. The dispersions thereof, preferably having a concentration of about 25 to 35% by weight, may be obtained by dispersing in a water-in-oil emulsion a water-soluble, NH-active substance of high molecular weight in a concentration of about 10 to 50% by weight, and reacting the dispersion thus obtained, under the conditions of the Mannich reaction, with monomeric and/or polymeric formaldehyde, preferably with the use of an aqueous formaldehyde solution emulsified in the organic phase, and a primary or secondary amine. At the same time, the possibility exists of controlling the content of the polymeric, water-soluble Mannich base in the end product by using amounts of formaldehyde and amine which are equivalent or subequivalent to the dispersed polymeric NH-active compounds. It has additionally been found that the products of the invention are likewise obtained by subjecting water-soluble monomeric Mannich bases to polymerization in a water-in-oil emulsion.

Substances which can be dispersed in a water-in-oil emulsion and which are accessible to the Mannich reaction are NH-active compounds, especially acrylic amide and methacrylamide as well as polymers or copolymers thereof with other polymerizable compounds. Especially suited are water soluble polymers and copolymers of acrylamide such as polyacrylamide and copolymers of acrylamide with acrylonitrile, salts of acrylic acid, esters of acrylic acid, styrene, vinyl acetate, vinyl chloride, vinyl pyrrolidone, vinyl imidazole and/or vinyl pyridines.

Amines suited for the reaction include those which carry active hydrogen such as amines of the formula $R-NH_2$ and/or $R-NH-R'$ wherein R and R' are alkyl or hydroxyalkyl radicals with 1 to 18 carbon atoms. For the purposes of the invention those amines are preferred which have straight chains of not more than about 8, preferably not more than about 6 carbon atoms. Suitable amines, for example, include methylamine, ethylamine, propylamine, butylamine, pentylamine, hexylamine, heptylamine and octylamine. Of the straight chain amines suited for the practice of the invention the secondary amines are preferred. Especially preferred secondary amines include, for example, dimethylamine and diethylamine. Diethanolamine is an example of a hydroxyalkylamine suitable for practice of the invention.

For the preparation of the stabilized system for the dispersion of the water-soluble, NH-active monomers, polymers and/or copolymers, a water-in-oil emulsion is used. Aliphatic and/or aromatic hydrocarbons are usable as the oily phase. The water-in-oil emulsion is obtained by the use of emulsifiers of a suitable HLB number, especially sorbitan esters and other oil-soluble fatty acid esters, such as fatty acid polyglycol esters.

The formaldehyde and amine are employed in approximately equimolar amounts. The formaldehyde is present in about 0.1 to 1.1 and preferably about 0.25 to 1 times the molar amount of the NH-active monomer unit, e.g. acrylamide or methacrylamide, i.e. the NH-active monomer unit being present in about 0.9 to 10 and preferably about 4 to 10 times the molar amount of the formaldehyde. The formaldehyde may be employed as a polymer thereof, e.g. trioxane.

The molecular weight of the Mannich base polymer desirably exceeds about 50,000 and preferably exceeds about 100,000.

The materials added to the emulsion to effect stabilization thereof are preferably amine salts or amines. The chain length is not important as long as the solubility in water is not affected. However, those amines which are particularly easily accessible industrially are preferably used, these amines having up to about 18 carbon atoms, and especially the lower mono- or multivalent amines having 1 to 6 carbon atoms. The aliphatic amines deserve particular mention from among the primary and secondary mono- or multivalent amines used.

Suitable amines are, for example, ethylamine, propylamine, isopropylamine, butylamine, cyclohexylamine, dimethylamine, diethylamine and dipropylamine.

When carboxylic acid amines are used as stabilizing additives, then in this case too, the amides of lower carboxylic acids having from 1 to 6 carbon atoms are especially suitable; however, the amides of higher carboxylic acids, for example, the amides of fatty acids having up to about 18 carbon atoms may also be used. Suitable carboxylic acid amides are, for example, acetamide, butyramide, valerylamide etc.

Thus as additives according to the invention which may be added to aminomethylated polyacrylamide suspensions, amine salts may be used alone or in admixture with amines. Furthermore, combinations of amine salts and ammonia, for example ammonium chloride and ammonia, and carboxylic acid amides, especially of aliphatic carboxylic acids having from 1 to 6 carbon atoms in the molecule may be used.

The concentrations of the stabilizers or combinations of stabilizers to be added are at least 5% by weight, calculated on the proportion of polymeric Mannich base, wherein the amount to be added depends on the estimated storage time and storage temperature in each case, i.e,. when the product is used within a short time less stabilizer is added, and when it is likely that the period of storage will be longer, correspondingly more stabilizer is added.

Thus, for example, stabilizer additions of about 25 to 40%, relative to the polymeric Mannich bases, effect a stability lasting more than 3 months.

In the case of the mixtures of stabilizers to be used, the ratios of amine salt to amine or of ammonium salt to ammonia are about 1:0.3 to 1:4, preferably about 1:0.3 to 1:20.

By adding amine to the liquid polyacrylamide Mannich base dispersion, the activity lifetime is not improved. In the same manner, an excess of amine during the preparation of these products, as they are described in Application Ser. No. 538,428, does not prevent the suspension products from becoming inactive. The addition of amine salts, however, or of carboxylic acid amides to liquid polyacrylamide Mannich base dispersions shows a clear stabilizing effect.

The addition of a mixture of amine salts and amines and also ammonium chloride and ammonia to the said dispersions yields products with an increased activity lifetime.

The stabilizing substances may be added to the polyacrylamide Mannich base dispersions in any manner, that is, during or after the preparation process of these products. Expediently, the addition of the stabilizing components is carried out in dissolved or emulsified form. Preferably the addition is carried out such that the solution of the stabilizing substances, with the addition of an organic liquid consisting of a hydrocarbon mixture containing dissolved emulsifiers, is made into a water-in-oil dispersion like the polymer dispersion present and added to the polymer suspension in this form. In this manner a breaking of the water-in-oil emulsion containing the polymer is prevented by adding the electrolyte.

The products according to the invention can be used analogously to those described in Application Ser. No. 538,428 as flocculation, sedimentation, retention and dehydration auxiliaries.

The use of the products occurs in known manner. First of all a solution of about 1% strength of the polymeric Mannich base is produced, advantageously by adding water to the product according to the process, with phase reversal of the dispersion. This solution is then gradually diluted with water to form a 0.5 to 0.05% strength, preferably a 0.1% strength, solution for general use.

The solutions of about 1% strength of the stabilized polyacrylamide Mannich bases are, unlike solutions of about 1% strength of, for example, water-soluble, polyquaternary salts, also stable. They remain unchanged in their activity over a period of up to 8 weeks which, as a general rule, exceeds the shelf life of these solutions by many times over. It is therefore possible to prepare dilute solutions of about 1% strength of polyacrylamide Mannich base dispersions in a large quantity and then to use them up gradually.

The preparation, the properties and the use of the polyacrylamide Mannich base products which can be produced according to the inventive process are explained by the following examples:

The details of the parts and the percentage combination of substances refer to the weight.

EXAMPLE 1 (Comparative Example)

42.00 parts of a polyacrylamide dispersion are introduced into the reaction vessel. The polyacrylamide dispersion is made up of 13.20 parts of polyacrylamide and 11.65 parts of water, the whole dispersed in 17.15 parts of a hydrophobic solution, called hereinafter the "organic phase", this solution consisting of 14.15 parts of a hydrocarbon mixture having a boiling point ranging from 244° to 332° C. and a refractive index of $n_D^{20}=1.445$, and comprising 75% of aliphatic hydrocarbons, 24.5% of naphthenic and about 0.5% of aromatic hydrocarbons, and the hydrophobic solution aslo containing 1.80 parts of sorbitan mono-oleate and 1.20 parts of stearic acid polyglycol ester (n=10).

By dissolving the constituents hydrocarbon mixture, sorbitan mono-oleate and stearic acid polyglycol ester (n=10), 12.20 parts of organic phase of an identical composition to that described, are prepared. In succession, 13.9 parts of aqueous 60% strength dimethylamine solution are emulsified by mixing with 6.1 parts of the organic phase and, separately, 13.9 parts of 40% strength formalin are emulsified by mixing with 6.1 parts of the organic phase. The emulsions containing the dimethylamine and formaldehyde are added to the polyacrylamide dispersion while stirring, such that the temperature of the reaction mixture remains below 40° C. during the addition and reaction. The reaction vessel is cooled if necessary. The conversion to the Mannich base ends after about 5 hours. Product A contains 29.0% of active substance.

The organic phase used in the following Examples has the same compositon as that according to Example 1.

EXAMPLE 2 (Comparative example)

6.5 parts of aqueous, 60% strength dimethylamine solution and 1.55 parts of the organic phase are combined and emulsified by stirring. Separately, 6.5 parts of 40% strength formalin and 1.55 parts of the organic phase are converted into a water-in-oil emulsion. The emulsions are added while stirring to 65.8 parts of a 31.4% strength polyacrylamide dispersion which has a composition like the polyacrylamide suspension of Example 1. Under the reaction conditions of Example 1, Product B is formed (Content of active substance: 31.4%).

EXAMPLE 3

To 86.5 parts of the product of Example 1 there are added while stirring, 18.5 parts of a water-in-oil emulsion consisting of 3.5 parts of water, 2.3 parts of dimethylamine, 60% strength in water, 7.7 parts of dimethylamine hydrochloride and 5.0 parts of the organic phase. The content of active substance in Product C is 23.9%.

EXAMPLE 4

87.0 parts of the product of Example 2 there are added while stirring, 18.0 parts of a water-in-oil emulsion consisting of 3.4 parts of water, 2.1 parts of dimethylamine, 60% strength in water, 7.5 parts of dimethylamine hydrochloride and 5.0 parts of organic phase. The content of active substance in Product D is 26.0%.

To test the effectiveness of the products prepared in Examples 1 to 4 there are available test methods which are used in industry, for example, the determination of the rate of sedimentation of aqueous slurries of solids, the determination of the retention rate or the dehydration times of aqueous suspensions of solids, the operation being undertaken in each case under specific conditions after the addition of the polymeric Mannich base.

Products A, B, C and D were advantageously judged on the effect they had in accelerating sedimentation in aqueous clay slurries. For this purpose the products were first of all dissolved to made a 1% strength solution in water, optionally accelerated by adding a wetting agent, (3 to 6% relative to the quantity of product). The 1% strength solution was further diluted with water in a ratio of 1:10.

The test of the products obtained according to the invention proceeded as follows; the flocculation agent was added in a concentration of 4 ppm in each case to the aqueous clay slurry which has a solids content of 20 g/l and is adjusted to a pH-value of 4.8 with $Al_2(SO_4)_3$. After this, the settling speed of the sediment was measured, i.e. the time in which a given level of sedimentation had been reached. This sedimentation time is denoted as the flocculation value FV (seconds). The increase in the activity lifetime is denoted by the letter S listed in the following Table II next to the flocculation value FV; the numeral S shows the quotients of the flocculation value at that particular moment to original flocculation value (first day). (For method of test compare: H. Akyel, M. Neven, Chem.-Ing. Techn. 39 (1967) 172).

Since the effectiveness of the Mannich base products rapidly deteriorates if the products are stored warm, products stored both at room temperature (20°) and at 40° C. were examined.

The stabilizing effect of the inventive additives is illustrated by the following table comparing the activity lifetime of the different products.

Table I:

Flocculation values (sec.) after addition of 4 ppm of flocculation auxiliary to aqueous clay slurries after storage of the flocculation auxiliary.
(without addition FV: 180 sec.)

| Product | A | | | | B | | | | C | | | | D | | | |
|---|---|---|---|---|---|---|---|---|---|---|---|---|---|---|---|---|
| Time | 20° C. | | 40° C. | | 20° C. | | 40° C. | | 20° C. | | C. | | 20° C. | | 40° C. | |
| (Days) | FV | S | FV | S | FV | S | FV | S | FV | S | FV | S | FV | S | FV | S |
| 1 | 10.8 | 1.0 | 49.8 | 4.5 | 10.5 | 1.0 | 64.0 | 6.1 | 7.4 | 1.0 | | | 6.2 | 1.0 | | |
| 2 | | | 65.0 | 6.0 | | | 84.0 | 8.0 | | | | | | | | |
| 3 | | | >120 | 11 | | | >120 | 11 | 7.4 | 1.0 | 9.1 | 1.2 | 6.2 | 1.0 | 7.9 | 1.2 |
| 4 | | | | | | | | | | | | | | | | |
| 5 | 10.2 | 1.0 | | | 13.1 | 1.2 | | | | | 8.1 | 1.1 | | | 8.1 | 1.2 |
| 6 | 10.1 | 1.0 | | | 16.3 | 1.6 | | | | | | | | | | |
| 7 | 11.4 | 1.1 | | | 19.7 | 1.9 | | | | | 10.2 | 1.4 | | | 9.3 | 1.4 |
| 8 | 12.4 | 1.1 | | | 26.8 | 2.6 | | | | | | | | | | |
| 9 | | | | | | | | | | | | | | | | |
| 10 | | | | | | | | | | | 13.5 | 1.8 | | | 31.6 | 4.8 |
| 11 | 13.4 | 1.2 | | | 32.8 | 3.1 | | | | | | | | | | |
| 12 | 14.1 | 1.3 | | | 40.0 | 3.8 | | | | | | | | | | |
| 13 | | | | | 50.6 | 4.8 | | | | | | | | | | |
| 14 | 14.7 | 1.4 | | | 51.8 | 4.9 | | | | | 15.7 | 2.1 | | | 30.6 | 4.6 |
| 15 | | | | | | | | | | | | | | | | |
| 17 | 26.0 | 2.4 | | | | | | | | | | | | | | |
| 21 | | | | | | | | | | | 27.8 | 3.8 | | | 34.5 | 5.2 |
| 25 | | | | | | | | | | | 28.1 | 3.8 | | | 37.2 | 5.6 |
| 27 | | | | | 101.5 | 9.7 | | | | | | | | | | |
| 29 | 29.4 | 2.7 | | | >120 | 11 | | | | | | | | | | |
| 40 | >120 | 11 | | | | | | | | | | | | | | |
| 56 | | | | | | | | | | | 9.9 | 1.3 | 7.0 | 1.1 | | |
| 70 | | | | | | | | | | | 9.9 | 1.3 | 7.6 | 1.2 | | |
| 91 | | | | | | | | | | | | | | | | |
| 99 | | | | | | | | | | | 10.2 | 1.4 | | | | |
| 110 | | | | | | | | | | | 12.0 | 1.7 | | | | |

A and B are unstabilized products according to Application Ser. No. 538,428; these products differ in their content of basic groups according to comparative Examples 1 and 2.

C and D are products according to the invention; they correspond to products A and B, but contain an addition of dimethylamine hydrochloride and dimethylamine.

Table II shows the flocculation values (in seconds) of the inventive products C and D after the addition of 4 ppm of flocculation agent to aqueous clay slurries after storage of the product in the form of the 1% strength solution in water.

| Product | C | | D | |
|---|---|---|---|---|
| Time (days) | FV | S | FV | S |
| 0 | 7.6 | 1.0 | 6.2 | 1.0 |
| 24 | 8.9 | 1.2 | 7.1 | 1.1 |
| 56 | 9.3 | 1.2 | 7.5 | 1.2 |

The dependence of the activity lifetime of the polyacrylamide Mannich base dispersion on the quantity of stabilizer added is shown in Table III. Starting from the polyacrylamide Mannich base dispersion according to Application Ser. No. 538,428, product A, and products E to J of Table III are prepared by adding the following components: starting from 50 parts of the non-stabilized product A: product E contains additionally 6.2 parts of aqueous 60% strength dimethylamine;

product F contains additionally 4.9 parts of dimethylamine hydrochloride in 1.4 parts of water;
product G contains 1.0 part,
product H contains 2.0 parts and
product I contains 4.0 parts of a solution of 14.65 parts of dimethylamine hydrochloride, 24.2 parts of aqueous 60% strength dimethylamine and 52.7 parts of water, in each case relative to 20.0 parts of product A;
product J was prepared from 20.0 parts of product B and 4.0 parts of acetamide.

EXAMPLE 5

300.0 parts of a 31.2% strength polyacrylamide dispersion (of the composition corresponding to Example 1) are reacted with water-in-oil emulsions consisting of 99.5 parts of aqueous 60% strength dimethylamine and 61.0 parts of the organic phase and 99.5 parts of 40% strength formalin and 61.0 parts of the organic phase under the conditions described in Example 1. After 5 hours the reaction product is used according to Examples 6 to 9.

EXAMPLE 6

To 20.0 parts of the product of Example 5 there are added drop by drop while stirring, 4.0 parts of a solution of 36.0 parts of dimethylamine hydrochloride, 14.0 parts of water and 22.5 parts of diethylamine. Product K.

EXAMPLE 7

To 20.0 parts of the product of Example 5 there are added drop by drop while stirring, the mixture, 2.0 parts Table III:

Flocculation values (sec.) after addition of 4 ppm of flocculation auxiliary to aqueous clay slurries after storage of the flocculation auxiliary.

| Product | E | | | | F | | | | G | | | | H | | | |
|---|---|---|---|---|---|---|---|---|---|---|---|---|---|---|---|---|
| Time | 20° | | 40° | | 20° | | 40° | | 20° | | 40° | | 20° | | 40° | |
| (days) | FV | S | FV | S | FV | S | FV | S | FV | S | FV | S | FV | S | FV | S |
| 1 | 5.4 | | | | 5.0 | 1.0 | 5.8 | 1.2 | 7.8 | 1.0 | | | 9.8 | 1.0 | | |
| 2 | | | | | | | | | | | 8.2 | 1.1 | | | 9.7 | 1.0 |
| 3 | | | — | | | | | | | | | | | | | |
| 4 | — | Prod. solid | | Prod. solid | 7.1 | 1.4 | | | | | | | | | | |
| 5 | | | | | | | | | | | 62.8 | 8.1 | | | 10.2 | 1.0 |
| 6 | | | | | | | 55.5 | 11.1 | | | | | | | | |
| 7 | | | | | | | | | | | 73.0 | 9.4 | | | 17.1 | 1.7 |
| 8 | | | | | | | | | | | | | | | | |
| 9 | | | | | | | 110.0 | 22.2 | | | | | | | | |
| 10 | | | | | | | | | | | | | | | | |
| 12 | | | | | | | 120.0 | 24 | | | 120.0 | 15.4 | | | | |
| 15 | | | | | | | | | | | | | | | | |
| 18 | | | | | 8.0 | 1.6 | | | | | | | | | | |
| 20 | | | | | | | | | | | | | | | | |
| 29 | | | | | 33.0 | 6.6 | | | 8.7 | 1.1 | | | 10.4 | 1.1 | | |
| 40 | | | | | | | | | 25.7 | 3.3 | | | 12.9 | 1.3 | | |
| 42 | | | | | 62.0 | 12.4 | | | | | | | | | | |
| 51 | | | | | | | | | 36.0 | 4.6 | | | 13.8 | 1.4 | | |
| 55 | | | | | 67.2 | 13.4 | | | | | | | | | | |
| 64 | | | | | 93.0 | 18.6 | | | 46.0 | 5.9 | | | 14.1 | 1.4 | | |

| Product | I | | | | J | | | |
|---|---|---|---|---|---|---|---|---|
| Time | 20° | | 40° | | 20° | | 40° | |
| (days) | FV | S | FV | S | FV | S | FV | S |
| 1 | 10.0 | 1.0 | | | 9.8 | 1.0 | — | — |
| 2 | | | 9.6 | 1.0 | | | | |
| 3 | | | | | | | | |
| 4 | | | | | | | | |
| 5 | | | 10.8 | 1.1 | | | | |
| 6 | | | | | | | | |
| 7 | | | 10.0 | 1.0 | | | | |
| 8 | | | | | | | | |
| 9 | | | | | | | | |
| 10 | | | | | | | | |
| 12 | | | 61.1 | 6.1 | | | | |
| 15 | | | | | | | | |
| 18 | | | | | | | | |
| 20 | | | 79.9 | 8.0 | 24.2 | 2.5 | | |
| 29 | 10.7 | 1.1 | 120.0 | 12.00 | 60.7 | 6.2 | | |
| 40 | | | | | | | | |
| 42 | | | | | | | | |
| 51 | 10.8 | 1.1 | | | | | | |
| 55 | | | | | | | | |
| 64 | 11.2 | 1.1 | | | | | | | of a solution of 45.0 parts of 25% strength ammonia, and 20.0 parts of ammonium chloride. Product L.

EXAMPLE 8

To 20.0 parts of the product of Example 5 there are slowly added 2.95 parts of a solution of 36.0 parts of dimethylamine hydrochloride, 10.0 parts of water and 18.0 parts of 25% strength ammonia. Product M.

EXAMPLE 9

To 20.0 parts of the product of Example 5, there are added 2.95 parts of a solution of 36.0 parts of dimethylamine hydrochloride, 15.0 parts of water and 18.0 parts of diethylamine. Product N.

EXAMPLE 10

To 40 parts of a 31.7% strength polyacrylamide dispersion (according to Example 1) are added 20.0 parts of the organic phase. A solution of 23.4 parts of dipropylene triamine and 13.8 parts of formalin (40% strength) are added dropwise to the polymer dispersion while stirring and cooling with an ice bath. The reaction is effected within 5 hours. 28.6 parts of a solution of 65.7 parts of dipropylene triamine, 150.0 parts of 37% strength hydrochloric acid and 148.5 parts of 60% strength aqueous dimethylamine solution are added to 100.0 parts of the reaction product. The product O contains 26.0% of active substance.

Products K to O are tested in a manner analogous to the previously applied method. The results are compiled in Table IV.

EXAMPLE 11

Dehydration of sewage
Sludge pH: 8.0
dry substance: 3.5%
Activated sludge pH: 7.8
dry substance: 3.7%

Table V

| | Dehydration time $t_E$(sec) and clarification of sewage after the addition of the polyelectrolytes: | | | |
|---|---|---|---|---|
| | sludge $t_E$/clarification | | activated sludge $t_E$/clarification | |
| Product | 100 ppm | 200 ppm | 100 ppm | 200 ppm |
| Comparison product | | | | |
| Polymer of methacrylic acid trimethyl ammonium ethyl ester chloride | 59.0″/2 | 26.1″/1-2 | 43.0″/1-2 | 4.2″/0-1 |
| Product according to the invention. | | | | |
| Product C | 20.3″/1-2 | 7.4″/0-1 | 15.2″/0-1 | 3.0″/0-1 |

$t_E$: Time for 200 ml of filtrate (= concentrate)
Clarification 0: concentrate clear
Clarification 5: concentrate black

EXAMPLE 12

Use as dehydration and retention auxiliary in paper manufacture.

As a function of the amount of product added, the rate of dehydration was measured as the change in the grinding grade according to Schopper-Riegler (°S.R.) and the retention capacity was determined by gravimetric analysis of the solids content in the discharge of a sheet former (Rapid-Kothen). The results are summarized in Table VI.

Table IV:

| | Flocculation values (sec.) after addition of 4 ppm of flocculation agent to aqueous clay slurries after storage of the flocculation agent at 40° C. | | | | | | | | |
|---|---|---|---|---|---|---|---|---|---|
| Product | K 40° C. | | L 40° C. | | M 40° C. | | N 40° C. | | O |
| Time (days) | FV | S | FV | S | FV | 3 | FV | S | FV | S |
| 0 | 5.4 | 1.0 | 5.1 | 1.0 | 4.2 | 1.0 | 4.4 | 1.0 | 33.3 | 1.0 |
| 1 | | | 10.4 | 2.0 | 5.8 | 1.4 | 5.9 | 1.3 | | |
| 3 | | | | | | | | | | |
| 4 | 12.8 | 2.4 | | | | | | | | |
| 5 | | | 32.0 | 6.3 | | | | | | |
| 6 | | | | | 15.2 | 3.6 | 21.4 | 4.9 | 54.8 | 1.6 |
| 8 | 23.0 | 4.3 | | | 16.7 | 4.0 | 23.4 | 5.3 | | |
| 12 | | | 120.0 | 24.0 | 17.9 | 4.3 | 26.1 | 5.9 | 67.3 | 2.0 |
| 14 | 84.0 | 15.6 | | | | | | | | |
| 15 | | | | | 54.2 | 12.9 | 34.0 | 7.7 | | |
| 19 | Prod. solid | | | | Prod. solid | | 36.0 | 8.2 | | |
| 28 | | | | | | | | | | |
| 40 | | | | | | | 56.5 | 12.8 | | |
| 43 | | | | | | | 57.0 | 12.9 | | |
| 46 | | | | | | | Prod. solid | | | |

The following Examples show some of the ways in which the inventive products can be used in industry.

TABLE VI

| | Dehydration: grinding grade (°S.R.) after addition of | | | Retention: Solids content (mg/l) in screen water with the addition of | | |
|---|---|---|---|---|---|---|
| Dehydration and retention agent | 0.02 | 0.04 | 0.06(%) | 0.005 | 0.01 | 0.02(%) |
| Copolymer of acrylamide and methacrylic acid trimethylammon- | 67 | 61 | 54 | 156 | 125 | 107 |

TABLE VI-continued

| | | | | | |
|---|---|---|---|---|---|
| ium ethyl ester chloride in water-in-oil dispersion | | | | | |
| Product D | 61 | 52 | 43 | 112  101 | 95 |
| Without addition | | 69° S.R. | | 482 mg/l solids in waste water. | |
| Crude substances | | Used paper, 10% pH : 4.5 (Al$_2$(PO$_4$)$_3$), H$_2$SO$_4$ | | Pine/Beech 70: 30 25% China clay: 1% rosin size, adjusted with Al$_2$/SO$_4$)$_3$ and sulphuric acid to pH 4.8; Content: 3g/l | |

EXAMPLE 13

Clarification of titanium ore digestion solution ("black solution"). The clarification effect was tested using product C as flocculation auxiliary on a mineral acid ilmenite digestion solution. The hot, turbid digestion solution was introduced into 200 ml capacity measuring cylinders and 5 ml of 0.1% strength aqueous solution of product C was added. The measuring cylinders were kept at 60° C. in analogy to the operating conditions. The flocculation agent was dispersed in the slurry by stirring and the sedimentation was followed by reading off the sediment volume in specific time intervals (see Table VII). For comparison, a product corresponding to the present state of the art based on aminomethylated polyacrylamide was used which can be obtained commercially as an aqueous, viscous solution.

TABLE VII

| | Sedimentation volume | |
|---|---|---|
| Sedimentation time (mins) | Product C | Comparison product |
| 0 | 205 | 205 |
| 1 | 205 | |
| 2 | 200 | |
| 3 | 197 | 197 |
| 4 | 190 | |
| 5 | 180 | |
| 6 | 172 | 195 |
| 7 | 165 | |
| 8 | 157 | |
| 9 | 150 | |
| 10 | 142 | |
| 15 | 120 | 153 |
| 20 | 110 | 135 |
| 25 | 105 | 125 |
| 30 | 98 | 112 |
| Solids content of the supernatant solution | 0.11g/l | 0. g/l |
| Solids content in the bottom | 149 g/l | 145 g/l |

It will be appreciated that the instant specification and examples are set forth by way of illustration and not limitation, and that various modifications and changes may be made without departing from the spirit and scope of the present invention.

What is claimed is:

1. In the process of clarifying an aqueous liquid having material suspended therein comprising mixing said aqueous liquid with a settling composition, and allowing said mixture to settle, whereby the suspended material settles out more rapidly than in the absence of said composition, the improvement which comprises employing as said settling composition a stable dispersion of about 10 to 50% concentration by weight of a water-soluble polymeric Mannich base in a mixture of water, a water-insoluble liquid, a quantity of an emulsifier of a suitable HLB number effective to produce a stable water-in-oil emulsion, the Mannich base comprising an NH active polymer carrying carbonamide groups reacted with formaldehyde and a primary or secondary alkyl-or hydroxylakylamine wherein the alkyl groups have up to about 18 carbon atoms, said formaldehyde and said amine being employed in the reaction in approximately equimolar amounts and said formaldehyde being present in at least about 0.1 times the molar amount of the carbonamide groups, and a stabilizing member selected from the group consisting of
   (a) a water-soluble salt of an amine,
   (b) (a)in admixture with an amine,
   (c) (a)in admixture with ammonia,
   (d) an ammonium salt of a mineral acid plus ammonia, and
   (e) a carboxylic acid amide.

2. A process according to claim 1, wherein said NH-active polymer is an acrylamide polymer.

3. A process according to claim 1, wherein the amine of the Mannich base is dimethylamine or diethylamine.

4. A process according to claim 3, wherein said water-insoluble liquid is an aliphatic or aromatic hydrocarbon or a mixture of aliphatic and aromatic hydrocarbons and the water is emulsified therein, said NH-active polymer is polyacrylamide and is present in a concentration of about 25 to 35% by weight, the formaldehyde and amine are combined in approximately equimolar amounts and the acrylamide is combined in about 0.9 to 10 times the molar amount of the formaldehyde.

5. A composition according to claim 4, wherein the amide of the polymeric Mannich base is acrylamide, the stabilizer is present in about 5 to 40% by weight of the polymeric Mannich base, and the stabilizer is selected from the group consisting of
   (a) a water-soluble salt of an aliphatic primary amine having 1 to 6 carbon atoms,
   (b) a water-soluble salt of an aliphatic secondary amine having 1 to 6 atoms,
   (c) (a) in admixture with about 0.3 to 4 times its weight of an amine,
   (d) (b) in admixture with about 0.3 to 4 times its weight of an amine,
   (e) (a) in admixture with about 0.3 to 4 times its weight of ammonia,
   (f) (b) in admixture with about 0.3 to 4 times its weight of ammonia,
   (g) an ammonium salt and about 0.3 to 4 times its weight of ammonia, and (h) an amide of an aliphatic carboxylic acid having up to 6 carbon atoms.

6. A process according to claim 1, wherein the stabilizer is an amide of a carboxylic acid having 1 to 6 carbon atoms.

7. A process according to claim 1 wherein the stabilizer is present in about 5 to 40% the weight of the polymeric Mannich base.

8. A composition according to claim 1 wherein the stabilizer is a member selected from the group consisting of
    (a) a water-soluble salt of a primary amine,
    (b) a water-soluble salt of a secondary amine,
    (c) (a) in admixture with a primary amine,
    (d) (a) in admixture with a secondary amine,
    (e) (b) in admixture with a primary amine, and
    (f) (b) in admixture with a secondary amine.

9. A composition according to claim 1, wherein the stabilizer is a member selected from the group consisting of
    (a) a water-soluble salt of an aliphatic primary amine having 1 to 6 carbon atoms,
    (b) a water-soluble salt of an aliphatic secondary amine having 1 to 6 carbon atoms,
    (c) (a) in admixture with free amine, and
    (d) (b) in admixture with free amine.

10. A composition according to claim 1, wherein the stabilizer is a mixture selected from the group consisting of
    (a) a water-soluble amine salt plus an amine,
    (b) a walter-soluble amine salt plus ammonia,
    (c) an ammonium salt of a mineral acid plus ammonia, the weight ratio of the first-named component of each mixture to the second-named component ranging from about 1:0.3 to 1:4.

11. A composition according to claim 10, wherein the weight ratio of the first named component to the second-named component ranges from about 1:0.3 to 1:2.

* * * * *